United States Patent
Lederman

(10) Patent No.: US 6,605,216 B1
(45) Date of Patent: Aug. 12, 2003

(54) DEEP MEDIA FILTER

(75) Inventor: Ilan Lederman, Beer-Sheva (IL)

(73) Assignee: Sinomed Ltd., Beer Sheva (IL)

( * ) Notice: Subject to any disclaimer, the term of this patent is extended or adjusted under 35 U.S.C. 154(b) by 0 days.

(21) Appl. No.: 09/889,868

(22) PCT Filed: Jan. 18, 2000

(86) PCT No.: PCT/IL00/00033

§ 371 (c)(1),
(2), (4) Date: Jul. 20, 2001

(87) PCT Pub. No.: WO00/43097

PCT Pub. Date: Jul. 27, 2000

(30) Foreign Application Priority Data

Jan. 21, 1999 (IL) .................................................. 128172

(51) Int. Cl.⁷ ......................... B01D 24/00; B01D 24/46; B01D 29/62; B01D 33/44; B01D 41/02
(52) U.S. Cl. ........................ 210/269; 210/289; 210/290; 210/351
(58) Field of Search ................................ 210/269, 289, 210/290, 291, 350, 351

(56) References Cited

U.S. PATENT DOCUMENTS

| | | | |
|---|---|---|---|
| 4,157,959 A | 6/1979 | Wen et al. .................. 210/807 |
| 4,624,789 A | * 11/1986 | Fan et al. .................... 210/661 |
| 5,248,415 A | 9/1993 | Masuda et al. ............. 210/154 |
| 5,277,829 A | 1/1994 | Ward ........................... 210/792 |

FOREIGN PATENT DOCUMENTS

JP    59123505    7/1984

* cited by examiner

Primary Examiner—Ivars Cintins
(74) Attorney, Agent, or Firm—Lilling & Lilling P.C.

(57) ABSTRACT

A compact, rapid upflow deep media filter for removing suspended solids from a liquid flow, which includes: a filter casing having a liquid inlet port, a liquid outlet port, and a filter bed composed of a volume of granular filter media and located between the inlet port and the outlet port; and a screen, selectably movable between a first operative position and a second operative position within the filter casing, whereat in the first operative position the screen maintains the filter bed in a packed state so as to permit filtration therethrough of a liquid flow from the inlet port to the outlet port, and whereat in the second operative position the screen does not maintain the filter bed in a packed state such that in the presence of a liquid flow from the inlet port to the outlet port the volume of filter media expands so as to enable separation therefrom of suspended solids accumulated during filtration of the liquid flow therethrough.

17 Claims, 3 Drawing Sheets

DEEP MEDIA FILTER

FIELD OF THE INVENTION

The present invention relates generally to fluid purification systems, and in particular to high rate upflow deep media filtration systems.

BACKGROUND OF THE INVENTION

Fluid purification systems, which incorporate filtration apparatus for the separation of suspended solids from a liquid, are well known in the art. Amongst other uses, these systems play an important role in enhancing industrial, agricultural, and domestic water processing. Some filtration devices embody a deep media filter mechanism wherein dirt particles and other like solids are separated from a liquid by becoming lodged within cavities formed between the fragments of a granular filter bed. In practice, periodical replacement or cleansing of the filter medium must be undertaken, so as to remove or reduce the accumulated deposits which clog the filter medium and impair its effectiveness.

In general terms, the efficiency of a particular filtration device is determined having regard to a number of characteristics which include: the size and cost of the device and the life-span of its various components; the flow rate at which the filtration process may be carried out; the duration of a filtration cycle before cleansing procedures are required to be performed upon the filter medium; and any energy-saving features associated with operating the device.

Those skilled in the art will appreciate that a major factor which reduces the effectiveness of conventional deep media filters, is the rapid and disproportional accumulation of dirt particles within the uppermost layers of the filter bed. This accumulation of particles tends to form a dense cake of dirt on the upper surface of the filter bed, thereby limiting the filtering capabilities of the bed's deeper layers. In an effort to reduce or delay such clogging, some deep media filters make use of filter bed granules with varying diameters, which are arranged such that the granules decrease in size and coarseness among the deeper layers of the bed. While such an arrangement initially provides for an effective downward filtration process and reduced caking effect upon the top surface of the filter bed, the filter's efficiency diminishes over time owing to the reverse stratification of filter bed granules each time the filter medium is expanded during periodical washing and cleansing of the filter bed.

There are also known in the art, deep media filter mechanisms commonly referred to as "upflow filters", which provide for the upward filtration of liquids so as to enable the suspended solids contained therein to accumulate over various layers of the filter bed. These devices typically contain filter beds which are arranged so that larger granules form the deeper layers of the bed and smaller granules form the upper layers of the bed. When upward filtration techniques are adopted, filter efficiency increases since only the biggest particles of the liquid being filtered will become lodged within the cavities of the deeper layers of the filter bed, thereby allowing a greater opportunity for smaller to medium sized particles to flow through to the middle and upper layers of the filter bed.

An indication of the state of the art of upflow filter mechanisms may be obtained by referring to U.S. Pat. No. 5,277,829, entitled "Deep Bed Sand Filter", and JP Patent No. 59-123505 for upflow filtration apparatus. The '829 patent describes an upflow filter which contains contiguous upper, lower and intermediate regions between the top and bottom ends of an upright vessel. The intermediate region contains particulate filter media for removing suspended solids from an upwardly moving influent. As the influent moves upwardly through the intermediate region, the dirtied media moves downwardly into the lower region whereupon it is collected at the bottom of the vessel and transported via an external transport pipe to a regenerative washing compartment located within the upper region. Preferably transport of the dirty sand is achieved by injecting air into the transport pipe as it rises vertically along the exterior of the vessel.

Amongst the disadvantages presented by the above-described filtering device, are limitations on its usage which result from the filter's unusually large dimensions. Further, the filtering efficiency of the device is limited with respect to liquids containing high or fluctuating dirt concentrations. Additionally, the washing process is not sufficiently aggressive to properly cleanse the filtering media from long or adhesive dirt particles.

Considering now the '350 patent referred to above, there is described therein a vertically arranged upflow filter, having a triple-layered filtering bed arranged between two porous plates. The middle layer of the filter bed constitutes the filter's main filtering body, and is formed of a relatively fine grains ranging from 0.5 to 2 mm in size, and having a specific gravity slightly greater than that of water. The upper and lower layers of the filtering media respectively prevent direct contact of the middle-layer granular material with the upper and lower porous plates, so as to prevent clogging thereabout.

In use, a liquid is upwardly filtered at a predetermined flow rate which is sufficient to cause the middle-layer granular material to float upwards and become compressed against the upper layer, but which is not so strong so as to cause fluidization of the lower granular support layer. As the middle layer floats upwards, its finer granules move more rapidly than its coarser granules, so as to form a graded filtering medium. Once a suitable filtering structure has been formed against the upper layer, the flow rate may be increased without causing fluidization of the middle layer. Thus the device provides for rapid filtration of a liquid. After a period of filtration, upflowing washing water is introduced at a slower flow rate than the rate of filtration, so as to allow the middle layer to expand and release the suspended solids trapped therein.

While the above filtering device seeks to provide an upflow filter for use in rapid filtration processes, its practical usefulness is limited by an undesirable build-up of dirt particles in the upper layer and upon the upper plate of the device, which necessitates additional downflow washing procedures. Secondly, even a momentary cessation of the pumping apparatus will lead to the downward dispersal of the structured middle-layer filtering granules, thereby causing serious operational problems throughout the device. Thirdly, cleaning of the filtering media is largely ineffective when the device is used for rapid liquid flows or filtering of liquids containing a high concentration of organic dirt particles. And fourthly, the synthetic nature of the filtering media reduces the filtering efficiency of the device.

SUMMARY OF THE INVENTION

The present invention seeks to provide improved apparatus and method for high rate deep media filtration of liquids containing suspended solids, which overcome disadvantages of known art.

There is thus provided, in accordance with a preferred embodiment of the invention, a compact, rapid upflow deep media filter for removing suspended solids from a liquid flow, which includes:

a filter casing having a liquid inlet port, a liquid outlet port, and a filter bed composed of a volume of granular filter media and located between the inlet port and the outlet port; and a screen, selectably movable between a first operative position and a second operative position within the filter casing, whereat in the first operative position the screen maintains the filter bed in a packed state so as to permit filtration therethrough of a liquid flow from the inlet port to the outlet port, and whereat in the second operative position the screen does not maintain the filter bed in a packed state such that in the presence of a liquid flow from the inlet port to the outlet port the volume of filter media expands so as to enable separation therefrom of suspended solids accumulated during filtration of the liquid flow therethrough.

Additionally, in accordance with a preferred embodiment of the invention, in the second operative position, the screen is positioned so as to be protected from suspended solids carried in a flow of liquid from the inlet port to the outlet port Further, in accordance with a preferred embodiment of the invention, the filter casing is constructed as a closed pressure vessel.

Additionally, in accordance with a preferred embodiment of the invention, the liquid inlet port is arranged at a lower end portion of the filter casing and the liquid outlet port is arranged at an upper end portion of the filter casing, and the filter casing includes an elongate cylindrical casing portion arranged between the inlet port and the outlet port for substantially housing the filter bed at least in its packed state.

Further, in accordance with a preferred embodiment of the invention, the filter casing also includes a conical casing portion arranged between a downstream end of the elongate cylindrical casing portion and the outlet port, and the conical casing portion diverges towards the outlet port such that when the screen is in the second operative position, the volume of filter media expands into the conical casing portion in the presence of a liquid flow of a predetermined minimum velocity.

Additionally, in accordance with a preferred embodiment of the invention, the filter casing further includes an additional cylindrical casing portion arranged between a downstream end of the conical casing portion and the outlet port.

Further, in accordance with a preferred embodiment of the invention, there is also included a diffuser unit which has a plurality of diffuser ports arranged downstream of the inlet port, and the deep media filter further includes a layer of gravel which is arranged immediately downstream of the diffuser ports and which is composed of grains whose effective diameter is greater than the effective diameter of the diffuser ports.

Additionally, in accordance with a preferred embodiment of the invention, when the screen is in the first operative position, the layer of gravel supports the filter bed in its packed state, and is operative to prevent ingress of granular filter media into the diffuser ports.

Further, in accordance with a preferred embodiment of the invention, in an initial arrangement, the volume of granular filter media is composed of granules whose effective diameter decreases in magnitude in the direction of flow from the inlet port to the outlet port.

Additionally, in accordance with a preferred embodiment of the invention, the volume of granular filter media is formed of a substance preselected so as to preserve the initial arrangement thereof following an expansion of the volume of filter media in the presence of a liquid flow.

Further, in accordance with a preferred embodiment of the invention, there is also included retaining apparatus for maintaining the screen in a selected position between one of the first and second operative positions.

Additionally, in accordance with a preferred embodiment of the invention, the retaining apparatus includes:

a retaining assembly housing the screen; and a movable support rod coupled to the retaining assembly and operative to facilitate selectable translation of the screen between the first and second operative positions.

Further, in accordance with a preferred embodiment of the invention, the retaining assembly includes:

a liquid permeable support plate for supporting the screen; and an annular sealing element disposed about the screen, such that when the screen is arranged in the first operative position, the annular sealing element is operative to maintain sealing contact with the filter casing so as to prevent the passage of granular filter media therebetween.

Additionally, in accordance with a preferred embodiment of the invention, the annular sealing element is at least partially formed of a soft-bristled fibrous material.

Further, in accordance with a preferred embodiment of the invention, there is also included a buffer plate disposed within a downstream end portion of the filter casing transversely to a direction of flow of liquid from the inlet port to the outlet port, and operative to divert a flow of liquid about itself, such that when the screen is positioned immediately upstream of the buffer plate, suspended solids carried in a liquid flow from the inlet port to the outlet port flow around the screen and the buffer plate.

Additionally, in accordance with a preferred embodiment of the invention, the screen and the buffer plate are arranged coaxially, and the buffer plate has lateral dimensions greater than those of the screen.

Further, in accordance with a preferred embodiment of the invention, the screen and the buffer plate are arranged coaxially with respect to a longitudinal axis of the filter casing, and the outlet port is formed close to the longitudinal axis of the filter casing.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

The description set out hereinbelow relates to the construction and operation of a compact filtering device, which may be employed to achieve an efficient and rapid filtration of liquids used in industrial, agricultural, irrigation and domestic water filtering processes. While the description refers generally to the filtration of water containing dirt particles and like suspended solids, it will be appreciated that the described apparatus and method may be easily modified for use in the filtering of other liquid substances such as oil, fuel and the like.

Figure 1:
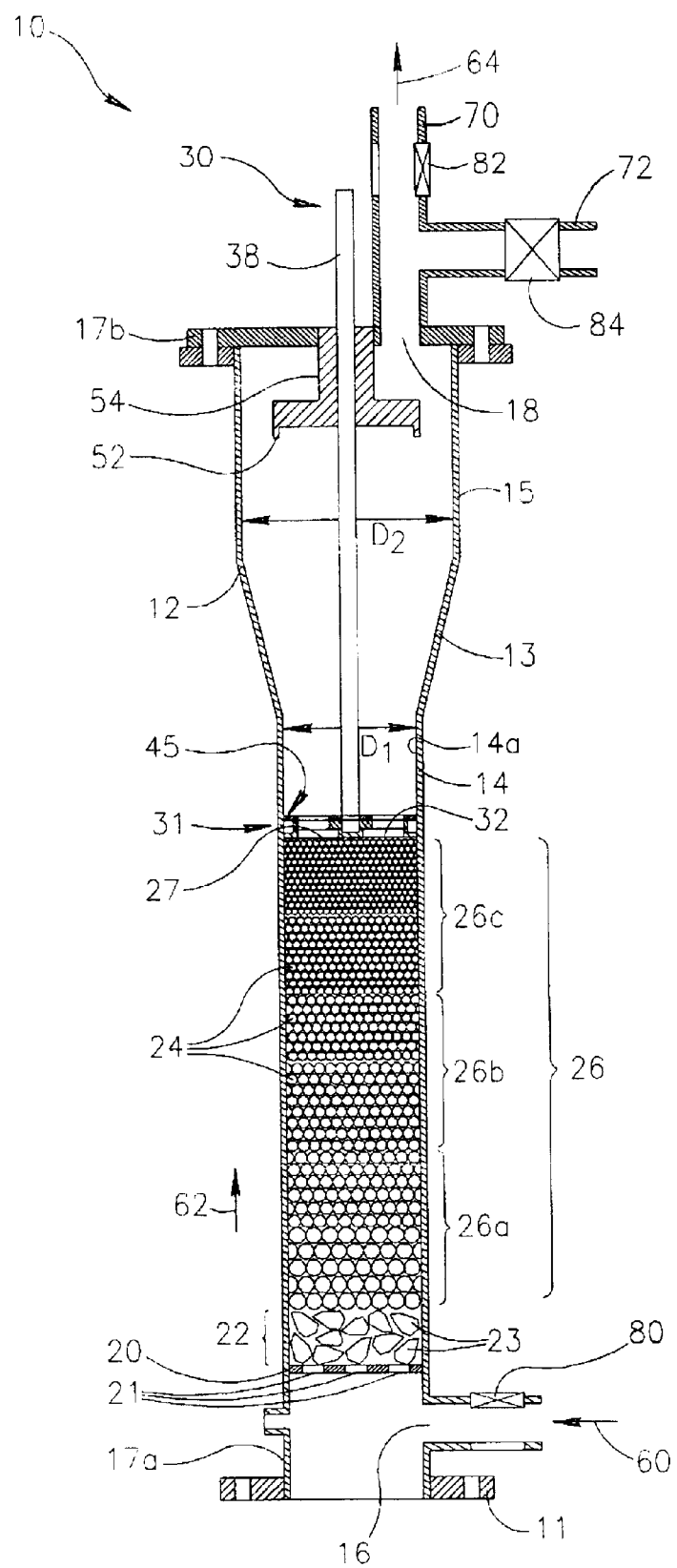
FIG. 1 is an axial sectional view of a deep media filter constructed in accordance with a preferred embodiment of the present invention, illustrating the filter's retaining apparatus in a first operative position, whereat the retaining apparatus is operative to maintain the device's filter bed in a packed state.
Figure 2:
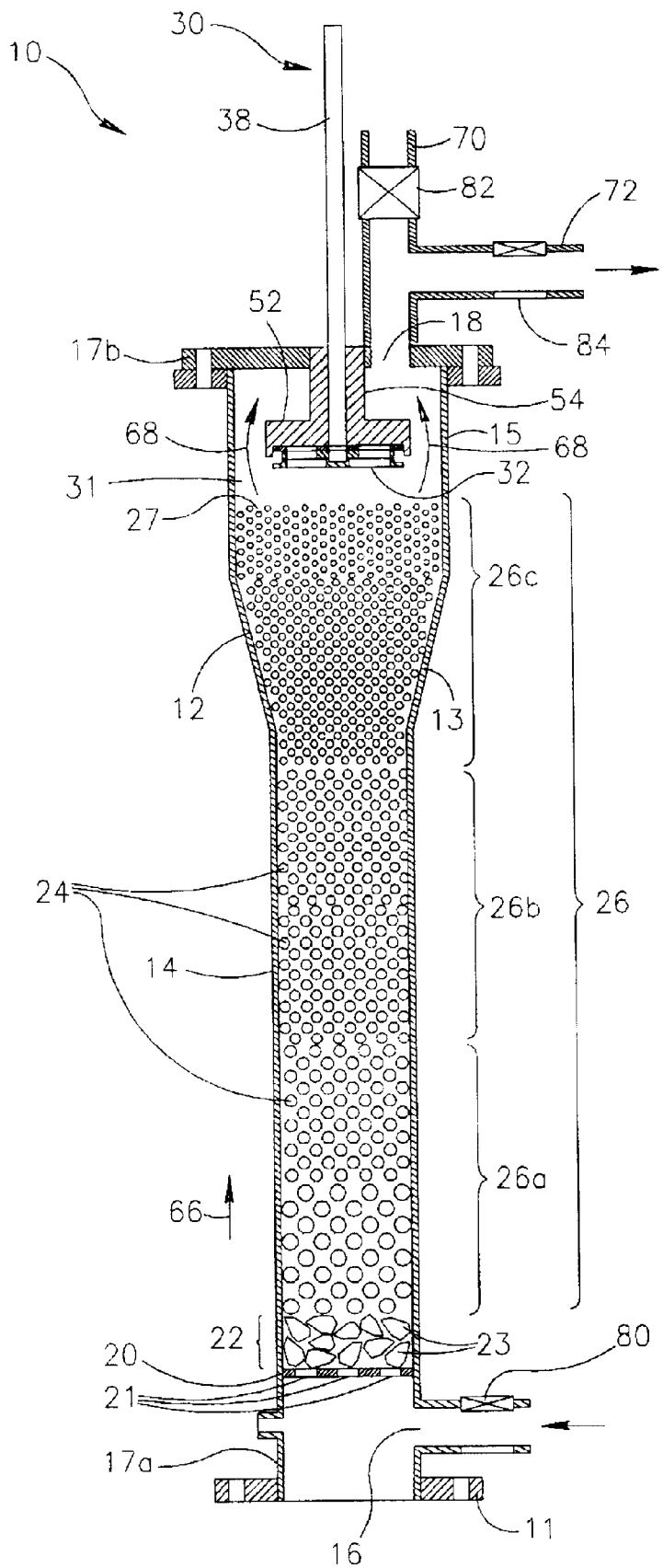
FIG. 2 is a view similar to that of FIG. 1, but illustrating the filter's retaining apparatus in a second operative position, whereat the filter bed is released from its packed state.

Referring generally to FIGS. 1 and 2, there is seen a deep media filter, referenced 10, constructed and arranged in accordance with a preferred embodiment of the invention and configured for operation in a generally upright position. In broad terms, filter 10 is constructed as a closed pressure vessel, configured for the rapid upward filtration of a liquid flow therethrough. For the purposes of clarity, it is noted that references in this description to "influent" and "filtrate", respectively relate to a liquid prior to, and subsequent to, its filtration treatment by filter 10.

Generally, filter 10 is operated in one of the following two modes: a first, filtering mode, wherein an influent is upwardly filtered through a filter bed formed by a packed volume of stratified granular filtering media, so as to remove suspended solids therefrom; and a second, cleansing mode, wherein the volume of filter media is released from its packed state and cleansed of suspended solids accumulated therein so as to restore its filtering efficiency.

Referring now to FIGS. 1 and 2 in more detail, filter 10 is characterized by a generally cylindrical filter casing, referenced 12, which is supported in a substantially upright position by a base member 11. For reasons which will be understood from the description below, filter casing 12 includes a conical casing portion 13, which as seen in FIGS. 1 and 2, extends between a first, lower, elongate cylindrical casing portion 14 and a second, upper, cylindrical casing portion 15. As illustrated in FIG. 1, diameter $D_1$ of casing portion 14 is less than diameter $D_2$ of casing portion 15, such that conical casing portion 13 broadens radially as it extends from casing portion 14 towards casing portion 15.

Also seen in FIGS. 1 and 2 are a liquid inlet port 16 and a liquid outlet port 18 which are respectively positioned at lower and upper end portions 17a and 17b of filter casing 12. In a preferred embodiment of the invention, outlet port 18 branches into a filtrate outlet 70 and a rinsing effluent outlet 72, so as to facilitate the interchange between the device's filtering and cleansing modes—both of which are described in further detail hereinbelow. As is also illustrated in FIGS. 1 and 2, each of inlet port 16 and outlets 70 and 72, has associated therewith a valve member, respectively referenced 80, 82 and 84. Referring still to FIGS. 1 and 2, there is seen a diffuser unit 20, having diffuser ports 21, arranged immediately above inlet port 16. In a preferred embodiment of the invention, diffuser unit 20 supports a gravel layer 22 which is formed of a plurality of gravel grains 23. During the operation of filter 10, diffuser unit 20 is operative together with gravel layer 22, to promote a uniform, upward "plug-flow" of incoming influent (not shown) close to diffuser ports 21.

In the present embodiment, gravel grains 23 have an effective diameter ranging between 7 to 10 mm, while diffuser ports 21 have a relatively smaller diameter of 4 to 5 mm so as to prevent a downward movement of gravel grains 23 into diffuser unit 20. It is noted that the size of diffuser ports 21 of the present embodiment are between 10 to 30 times larger than the size of the lateral collector ports of conventional down-flow filters, which function as diffuser ports during the cleansing modes of those filters. The relatively large size of diffuser ports 21, presents the present invention with a number of advantages as are described in detail hereinbelow.

It is also expressly noted, for the purposes of clarity, that the above configurations and relative dimensions of gravel grains 23 and diffuser ports 21, are provided by way of example only. As applies to this entire description, unless otherwise indicated, the configurations and relative dimensions provided herein should generally be considered as exemplary only and should not be seen to limit the invention in anyway. Thus, although in the present instance diffuser ports 21 are described as having a diameter thereby indicating their rounded configuration in a preferred embodiment of the invention, they may for example, alternatively be formed as equally spaced-apart slotted ports whose dimensions are such so as to prevent a downward movement of gravel grains 23.

Also seen in FIGS. 1 and 2, is a mass of granular filter particles 24. During filtering mode (FIG. 1), filter granules 24 are arranged in a packed state within casing portion 14 so as to form a deep media filter bed, referenced 26. In the present embodiment of the invention, filter bed 26 is supported by gravel layer 22, which in addition to aiding the upward dispersal of incoming influent, prevents a downward movement of filter granules 24 thereby protecting diffuser ports 21 from clogging.

Considering now the composition of filter bed 26 in more detail, filter granules 24 are typically formed of a single, common, preferably natural mineral such as quartz, wherein each granule has an effective diameter ranging between 0.25 and 6.0 mm. Filter granules 24 are horizontally stratified such that they decrease in size and coarseness when viewed from "bottom to top". Thus, the deeper "layers" of filter bed 26, referenced generally 26a, are formed of larger and coarser filter granules 24, while the middle and upper "layers" of filter bed 26, referenced generally 26b and 26c, are respectively formed of granules 24 which gradually become smaller and finer towards the top 27 of filter bed 26. It is specifically noted that the categorization and representation of filter granules in terms of "layers" 26a to 26c, is adopted for the purposes of simplicity and convenience of the present description only, and that in reality, filter bed 26 is composed of a single mass of filter granules 24, which gradually decrease in size in an upward direction.

Figure 3:
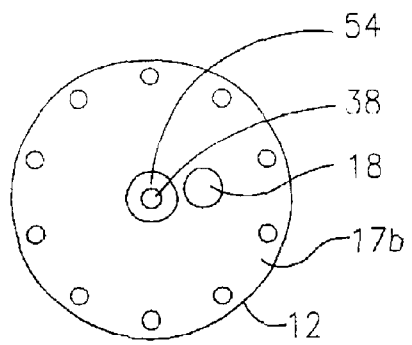
FIG. 3 is a plan view of the filter of FIGS. 1 and 2.

There is also provided as illustrated in FIGS. 1 and 2, retaining apparatus, referenced generally 30, which serves to maintain filter bed 26 in, and release filter bed 26 from, its packed state. In a preferred embodiment of the invention, retaining apparatus 30 includes a retaining assembly 31 attached to a movable support rod 38. As seen in FIGS. 1 and 2, rod 38 extends through upper end portion 17b of filter casing 12 so as to facilitate the lowering and raising of assembly 31 during operation of the invention. A horizontally arranged, buffer plate 52—which is typically disposed from end portion 17b of casing 12 via a stem portion 54 through which rod 38 also extends—defines the uppermost position to which retaining assembly 31 may be elevated. Preferably, stem portion 54 is arranged coaxially with respect to filter casing 12, so that rod 38 extends through the center of upper end portion 17b as is also seen in FIG. 3.

In accordance with a method of the invention, retaining assembly 31 is selectably movable between a first operative position (FIG. 1) and a second operative position (FIG. 2). In its first operative position, retaining assembly 31 maintains filter bed 26 in its packed, stratified state such that filter 10 may be operated in its filtering mode. When retaining assembly 31 is moved to its second operative position, filter bed 26 is released from its packed state thereby enabling filter 10 to be operated in cleansing mode. In this mode, the upward flow of liquid through filter bed 26, results in the fluidization of filter granules 24, thereby facilitating separation therefrom of suspended solids accumulated during the filtration process. Furthermore, when retaining assembly 31 is moved to the position depicted in FIG. 2, buffer plate 52 serves to hydraulically protect the retaining assembly 31 from the accumulation of suspended solids thereupon during the fluidization process. This aspect of the invention is described in further detail hereinbelow.

Figure 4:
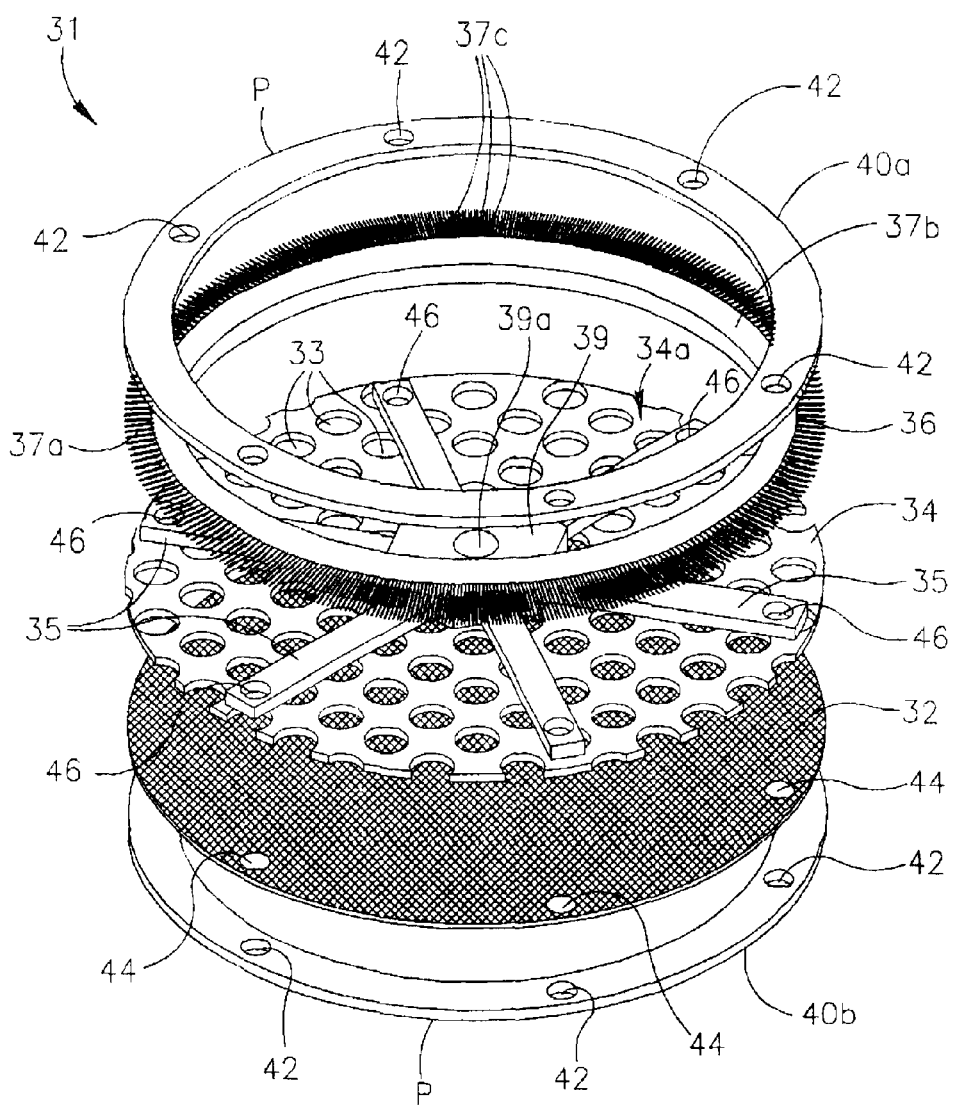
FIG. 4 is an exploded view of the retaining apparatus of the filter of FIGS. 1 and 2.

Referring now also to FIG. 4, it is seen that retaining assembly 31 includes a disc-like screen element, referenced 32, which is configured for pressing contact with top 27 of filter bed 26 when the retaining assembly 31 is positioned in its first operative position (FIG. 1). Screen 32 is typically formed of a tightly-woven mesh, such as a dutch-weave or wedge-wire material, whose weave is sufficiently close-knit so as to generally prevent the passing therethrough of the small fine filter granules 24 which form the uppermost filter bed layers 26c. A liquid-permeable support plate 34, such as is depicted in FIG. 4, is arranged immediately above screen 32, so as to give strength to, and prevent the rupture of, the screen 32 as it pressingly maintains filter bed 26 in a packed state during operation of the filter in filtering mode.

Support plate 34 may be formed of any suitable rigid material—such as an inflexible metal or hard plastic—and as seen in FIG. 4, typically has holes 33 which allow for the passage of a liquid after it has passed through screen 32. In the present embodiment, support plate 34 also has mounted upon an upward-facing surface 34a thereof, a plurality of radially extending ribs 35 which extend from a common geometric center. In addition to strengthening the support plate 34 so as to prevent it from bending during the operation of filter 10, ribs 35 also provide a means for securing the support plate 34 to other components of assembly 31 as described below. A connector piece 39, having a hole 39a, is also mounted over ribs 35 at the center of support plate 34, thereby providing for a connection between retaining assembly 31 and movable support rod 38.

Referring still to FIG. 4 in conjunction with FIGS. 1 and 2, retaining assembly 31 is seen to also incorporate a ring-shaped sealing element 36, which serves during the device's filtering mode, to prevent the escape of filter granules 24 via the interface 45 (FIG. 1) between retaining assembly 31 and an inner surface 14a of casing portion 14. Preferably, sealing element 36 is provided as an outer brush-like ring, referenced 37a, disposed about an inner support annulus 37b. The outer brush ring 37a is typically formed of a soft-bristled, fibrous material, which, although being sufficiently dense so as to prevent during filtering mode the passage therethrough of the fine filter granules forming filter bed layers 26c, will nevertheless not impede the movement of retaining assembly 31 within casing portion 14 as it moves between its first and second operative positions.

In order to secure screen 32, support plate 34, and sealing element 36 together in accordance with the present embodiment, coupling rings 40a and 40b are provided. As illustrated, each coupling ring 40a and 40b has formed therein, a plurality of holes 42 arranged in mutual registration with the other, configured for receiving suitable fastening elements (not shown) therethrough. In the present embodiment, screen 32 and ribs 35 similarly have holes, referenced 44 and 46 respectively, which are arranged in corresponding registration to holes 42 so as to allow the aforesaid fastening elements to also pass therethrough.

Furthermore, in the present embodiment, sealing element 36 is configured such that upon assembly of retaining assembly 31, bracing ring 37b is gripped between coupling ring 40a and support plate 34, thereby leaving at least a portion of brush ring 37a to outwardly protrude beyond the perimeter P of coupling rings 40a and 40b. It is this outward protrusion of fibrous material which provides the seal between assembly 31 and filter casing 14, thereby eliminating the potential for filter granules 24 to become directly trapped in between the rigid components of retaining assembly 31 and the casing 14.

It is noted that the abovedescribed construction of retaining assembly 31 is provided by way of non-limiting example only, and that any other suitable manner of securing the various components of assembly 31 is contemplated as falling within the scope of the present invention.

Referring once again to FIGS. 1 and 2, operation of filter 10 in performing a method of the invention, is now described. For the purposes of the present description, filter 10 may be operated either manually or wholly automatically. Similarly, semi-automated means may be employed to perform the method of the invention.

In accordance with the method of the invention, retaining apparatus 30 is initially lowered via rod 38 so that the retaining assembly 31 is brought into touching contact with top 27 of filter bed 26. Retaining assembly 31 is then further lowered to its predetermined first operative position (FIG. 1) so as to pressingly maintain filter granules 24 in a packed stratified state between gravel layer 22 and screen 32 of the retaining assembly. Retaining apparatus 30 is then secured in this position by any suitable securing means, thereby maintaining filter bed 26 in its packed state.

Following the formation of a packed filter bed 26 as described, inlet valve 80 and filtrate outlet valve 82 are set in an open position, while rinsing effluent outlet valve 84 is set in a closed position. Operation of filter 10 in filtering mode is then commenced. In this mode, a raw fluid—such as water containing suspended solids (not seen)—is introduced into filter 10 via inlet port 16 as indicated by arrow 60 of FIG. 1. Upon entering filter 10, the incoming influent is evenly diffused in an upward direction with the aid of diffuser 20. Arrow 62 of FIG. 1 indicates the direction of flow of an influent during filtering mode, which in a preferred embodiment of the invention, is typically filtered at a fluid velocity of between 30 to 60 meters per hour.

It is also noted that in accordance with a preferred embodiment of the invention, ports 21 of diffuser unit 20 are large enough so as to enable the suspended solids of the influent to flow upwardly therethrough with a minimal or negligible build up of dirt particles within or around the diffuser unit 20. As previously noted, in the present embodiment of the invention, diffuser ports 21 typically range between 4 to 5 mm in diameter—which in contrast to diffuser mechanisms incorporated within conventional filtering apparatus, are relatively large. Thus, the intensive pre-filtering processes which are generally required to be performed upon an influent, using delicate strainers, prior to the influent being introduced into a conventional filtering device, are not required to be performed prior to the operation of filter 10. In the event that a particular raw fluid does require pre-filtering before being introduced into filter 10, such pre-filtering may generally be achieved through the use of a simple coarse-grid device, such as a basket-type filter.

In accordance with the method of the invention, following the passage of an influent through diffuser unit 20, the influent is continued to be upwardly streamed through gravel layer 22 and filter bed 26 so as to progressively remove suspended solids contained therein. Although as previously noted, the primary role of gravel layer 22 is to assist diffuser unit 20 in promoting an even dispersal of an upflowing liquid, nevertheless, a small proportion of the larger-sized suspended solids contained in the liquid upflow, may become lodged between the cavities formed between gravel grains 23. By and large, however, the removal of suspended solids from an upflowing influent during this filtering stage of a liquid, is achieved via its passage through filter bed 26 as is now described.

Initially, the larger dirt particles suspended in the upflowing influent become trapped within the relatively large cavities or "voids" (not seen) formed between the coarse granules 24 of filter bed layers 26a. As the upflowing influent continues to pass through filter bed 26, the medium to smaller sized suspended solids contained therein respectively accumulate within the relatively medium to smaller sized voids formed between the granules 24 of filter bed layers 26b and 26c. During this upflow process, sealing element 36 functions to seal at the interface 45 (FIG. 1) between retaining assembly 31 and inner surface 14a of casing portion 14, thereby to prevent the escape of filter granules 24 therethrough.

It is of particular note, that in the case of the present invention, the stratified arrangement of filter granules 24 is strictly preserved throughout the entire filtering process by virtue of retaining apparatus 30 which is operative to maintain the filter bed 26 in a packed state. Thus, notwithstanding the rapid upflow of influent through filter bed 26 during filtering mode, the original stratification arrangement is wholly maintained.

Following filtration of a liquid flow through filter bed 26, the filtered liquid thereafter passes through screen 32 and support plate 34 of retaining assembly 31. It is noted that by the time the liquid flow reaches top 27 of filter bed 26, the suspended solids contained within the liquid influent will have substantially been removed by virtue of their being retained within the constricted voids formed between granules 24 of filter bed 26. Thus, screen 32 of retaining assembly 31 will be exposed only to a very minimal measure of suspended solids, if at all, and any suspended solids which do in fact accumulate thereabouts, will generally only be very small and fine in nature. Such suspended solids, like any fine filter particles 26 which may have managed to pass through screen 32, will effectively be dislodged from the screen 32 as retaining assembly is moved between its first and second operative positions. This cleansing process of screen 32 is described in further detail hereinbelow.

Following the passage of a liquid flow through screen 32 and support plate 34 of retaining assembly 31, the cleansed filtrate continues to travel upwardly through casing portions 13 and 15 as new influent is introduced into filter 10. The continued operation of filter 10 will cause the upward-flowing filtrate to flow towards outlet port 18, whereupon it exits filter 10 via filtrate outlet 70 as indicated by arrow 64 of FIG. 1. Thereafter, the treated filtrate may be directed to a suitable collection receptacle (not shown).

It will be appreciated from the above description, that the ongoing operation of filter 10 in filtering mode, will have the effect of causing an increase in pressure head losses within the filter as suspended solids accumulate between granules 24 of filter bed 26. Thus, in accordance with the method of the invention, operation of filter 10 in filtering mode is ceased upon the pressure loss within filter 10 reaching a predetermined magnitude. The cessation of filtering mode is achieved by setting either or both of valves 80 and 82 in a closed position—i.e. in addition to the already closed valve 84—so as to stop the flow of liquid through filter 10. For reasons which will be apparent from the description below, it is however preferred, that only filtrate outlet valve 82 be closed at this point.

Upon ceasing the liquid flow through filter 10, the filter is then arranged for operation in its second cleansing mode during which time filter bed 26 is fluidized and cleansed of suspended solids accumulated therein. This process—which in accordance with the present embodiment is typically performed at a fluid velocity of between 100 to 110 meters per hour—is now described in greater detail also in conjunction with FIGS. 1 and 2.

Referring more particularly to FIG. 2 for the moment, filter 10 is seen to be arranged for operation in its second cleansing mode. A comparison of FIGS. 1 and 2, illustrates that filter 10 is so arranged, by upwardly translating retaining assembly 31 from its first to second operative position until support plate 34 comes to abut buffer plate 52. As previously noted, this may be achieved either manually or by automated means, whereby movable rod 38 is used to raise the retaining assembly 31. It is noted that in accordance with the method of the invention, assembly 31 is moved from its first to its second operative position in the absence of a liquid flow.

Referring still to FIG. 2 in particular, it is seen that upon commencing filter 10's cleansing mode, the introduction of an upward flow of "rinsing" or "washing" liquid, as indicated by arrow 66, is operative to cause a fluidization and expansion of filter bed 26 such that the filter granules 24 rise within casing 12 of the filtering device. In accordance with the method of the invention, this liquid upflow is achieved by setting valves 80 and 84 in an open position, while leaving valve 82 in a closed position. Thus, in the above-described preferred case where the filtering mode of filter 10 is ceased by the closing of filtrate outlet valve 82 alone, the cleansing mode of filter 10 may be commenced by simply opening rinsing effluent outlet valve 84 after assembly 31 has been moved into its second operative position.

Considering now the fluidization process of filter bed 26 during cleansing mode in more detail, it will be appreciated that the continued upflow of rinsing liquid in accordance with the method of the invention, is operative to dislodge accumulated solids from between the floating filter granules 24. Once dislodged from filter granules 24, these solids are removed from filter 10 as the liquid upflow exits filter 10 via rinsing effluent outlet 72. Similarly, although during the cleansing process, granules 23 of gravel layer 22 do not rise in the same manner as filter granules 24—due to their larger size—nevertheless, the rapid upward flow of liquid passing through gravel layer 22 during cleansing mode, will be operative to cause at least a vibration of gravel grains 23, thereby also causing a release of any suspended solids which may have become trapped within the relatively large cavities formed between the various gravel grains 23. Once released, these larger particles will generally travel through the fluidized filter bed towards outlet port 18, in a similar manner to other solids released from filter bed 26 during the fluidization process.

It is a particular feature of the invention, that the graded stratification of filter bed 26 is fundamentally preserved even during the fluidization process of the filter's cleansing mode. Thus, notwithstanding the fluidization of the filter granules 24, the stratification of the fluidized bed is such so as to retain the gradual decrease in size and coarseness of the filter granules 24 in an upward direction.

Upon a sufficient cleansing of filter bed 26, the cleansing cycle of filter 10 may be stopped, and the filtering process may once again be commenced. In order to achieve an effective transition from cleansing mode (FIG. 2) to filtering mode (FIG. 1), the following steps may be adopted:

(a) resetting rinsing effluent outlet valve 84 into a closed position so as to bring the liquid flow through filter 10 to a halt;

(b) returning retaining assembly 31 to its predetermined first operative position (FIG. 1) so as to once again pressingly arrange filter granules 24 in a packed state between gravel layer 22 and screen 32; and (c) reopening filtrate outlet valve 82 so as to renew, with the aid of diffuser unit 20, an upward liquid filtering flow between inlet port 16 and filtrate outlet 70.

It will readily be appreciated by persons skilled in the art, that the combined apparatus and method of the present invention as described above, provide for a rapid upflow filtration process, which incorporates a number of significant advantages and features over those of conventional filtering mechanisms. Some of these advantages and features are outlined below, and where appropriate, suitable headings have been provided for purposes of convenience:

1) Use of a Single Type Mineral to Form Filter Bed 26

Unlike many conventional down-flow filtering mechanisms which employ a variety of minerals in an effort to achieve a stratification of their filtering media, the filter granules 24 of the present invention are typically formed of a single common mineral as previously noted. This is because the horizontal stratification employed in the present invention is such that fitter granules decrease in size and coarseness when viewed from "bottom to top". By way of contrast, however, those down-flow filtering devices whose granules increase in size and coarseness when viewed from "bottom to top", generally require the use of a number of different materials of varying densities, in order that the larger granules will rise to the top of the filter bed, and that the smaller granules will sink to the bottom of the filtering media.

2) Precise Stratification of Filter Bed 26 and its Continued Preservation During Filtering and Cleansing Modes One of the most notable features of the present invention, is the accuracy of filter granule stratification which may be attained, and the continued preservation of such stratification throughout the operation of the filtering device.

As previously noted, filter 10 provides for a rapid upflow depth filtration process through the use of a filter bed 26 composed of graded filter media particles 24. The stratification of filter bed 26 is generally unique as compared to conventional apparatus in that the effective size of the granular media particles 24 gradually decreases in the same direction as the stream flow of the device. Given that the graded stratified nature of the filter bed 26 is generally preserved throughout both the filtering and cleansing modes of the filter operation, it is possible to provide specific stratification arrangements based on known geometric size ranges of suspended solids. The required grain size may thus be calculated based on the general geometric equation that the average ratio of grain size to pore size (i.e. the size of pores between granular particles) is in the ratio of 10:1.

It is of further note, that the operation of filter 10 in its second cleansing mode also has the valuable effect of maintaining and promoting the horizontal stratification of filter granules 24. By way of example, the above described cleansing mode, will result in a natural or "true" stratification of filter bed 26 where stratification of the filter media has not been attained prior to the cleansing mode—given that during the fluidization process, the heavier, larger filter granules rise slower than the lighter, smaller filter granules. Similarly, the horizontal stratification of filter bed 26 is improved on account of the larger filter granules sinking faster than the smaller filter granules, when the upward liquid flow is ceased shortly prior to return of filter 10 from its second cleansing mode to its first filtering mode.

3) Conical Casing Portion 13

As previously described, filter casing 12 includes a conical casing portion 13, which extends between lower casing portion 14 and upper casing portion 15 (FIGS. 1 and 2). The purpose of this conical casing portion is to reduce the overall height which filter casing 12 would otherwise have been required to adopt in order to achieve an effective filter-media cleansing process without the loss of filter media. In simple terms, the conical casing portion 13 provides for the gradual reduction of fluid velocity as the liquid flow moves towards the broader upstream portions 13 and 15 of filter casing 12. Thus, the configuration of filter casing 12 in the present embodiment, allows for a liquid flow to be streamed through filter bed 26 during cleansing mode at an initial velocity sufficient to cause the fluidization of even the largest filter granules 24 contained in deeper filter bed layers 26a, whilst at the same time ensuring that the smallest grains of filter bed layers 26c do not flow out of filter 10 through outlet port 18.

It is also noted that a particular advantage of conical casing portion 13, is that it provides for a wide range of granule sizes within filter bed 26. More specifically, the provision for casing portion 15 to have a horizontal cross-sectional area of between 1.5 to 2.0 times the horizontal cross-sectional area of casing portion 14, enables the ratio of smallest filter granules 24 to largest filter granules 24 to fall within a ratio range of 1:10 and 1:20. This provides a major advantage over known art.

4) Protection of Screen 32 from Clogging During Cleansing Mode

As was previously described, filter 10 is arranged for operation in cleansing mode by, inter alia, upwardly moving assembly 31 from its first to second operative position—i.e. until support plate 34 of assembly 31 comes to abut buffer plate 52. In addition to acting as a stopper in the raising of assembly 31, plate 52 also serves to protect screen 32 against clogging during the operation of filter 10 in cleansing mode. In somewhat simplified terms, the positioning of assembly 31 against the blind plate which forms buffer plate 52, hydraulically protects screen 32 from the accumulation of solids thereupon, since the upward-flowing liquid will flow around assembly 31 and plate 52 as it seeks to exit filter 10 via outlet port 18. This is largely because outlet port 18 is, in the present embodiment of the invention, located near the radial center of upper end portion 17b of filter casing 12. In this regard, arrows 68 of FIG. 2 depict the general path of the upflowing liquid around assembly 31 and buffer plate 52 during cleansing mode, while FIG. 3 illustrates the preferred positioning of outlet port 18 with respect to portion 17b of filter casing 12.

5) Cleansing of Screen 32 and Sealing Element 36 between Filtering and Cleansing Modes Although as noted above, screen 32 is generally protected from clogging during operation of filter 10, a particular feature of the invention is that the actual movement of assembly 31—between its first and second operative positions—will have the effect of generally dislodging the minimal number of deposits which may have accumulated upon screen 32 during the filtering mode of filter 10. This is because in a preferred embodiment of the invention, both the upward and downward movements of assembly 31 are performed in the absence of a liquid flow through the filter.

Thus, as screen 32 is raised through the standing column of liquid contained within filter 10, it experiences a "backwash" effect thereby resulting in the removal of deposits lodged thereon. In particular, any deposits which may have accumulated on the downward facing surface of screen 32 are likely to be removed. Similarly, as screen 32 is lowered through the standing column of liquid prior to filtering mode of filter 10, it experiences a "forward-wash" effect whereby dirt particles which may have become settled upon an upward facing surface of screen 32 are likely to become dislodged therefrom so as to generally migrate back toward the filter bed 26 under the influence of gravitational forces.

A further consequence of the raising and lowering of retaining assembly 31 between filtering and cleansing modes, is that any small filter particles which may have become lodged within the fibrous brush material 37a of sealing element 36 during filtering mode of filter 10, will tend to loosen and become released therefrom once assembly 31 is moved out of its sealing position within first cylindrical casing portion 14. These filter particles will also tend to migrate back towards filter bed 26.

6) Raw Fluid may be Used During Cleansing Mode

One further feature of the present invention is that raw water may be used to create a liquid upflow during the cleansing mode of filter 10. This is in contrast to the need to use clear, non-polluted water during the washing modes of many conventional filtering devices, wherein delicate mushroom-like diffuser units having ports or slots of between 100–500 microns in diameter, are employed to diffuse washing water. By way of contrast in the case the present invention, raw water may be used in most applications of filter 10 to produce the liquid upflow during cleansing mode—given the relatively large diameter of diffuser ports 21 (i.e. 4.0 to 5.0 mm) which are not likely to become clogged by suspended solids as previously explained.

7) Liquid Flow during Filtering and Cleansing Modes are in the Same Direction

In contrast to known pressure vessel media filters, there is no need in the present invention, to convert the flow direction as filter 10 alternates between its filtering and cleansing modes. Such a requirement in existing media filters adds to the complexity and production cost of the filtering apparatus, and also often affects the overall size.

8) The use of Flocculents and Coagulants—Direct Filtration, Contact Filtration

In view of the aggressive energy flow which may be achieved in the vicinity of diffuser unit 20 grains 23, and having regard to the stratified nature of the filter media 24 as described above, the present invention provides a favorable environment for direct or contact filtration processes.

It will readily be appreciated by persons skilled in the art, that alternative embodiments of the invention are contemplated, and which, although not explicitly described in detail herein, are intended to be covered by the above description. By way of non-limiting example only, the following modifications to filter 10 are also contemplated as falling within the scope of the invention:

(i) a filtering device similar to filter 10 described above, and also including strategically placed nozzles for the release of gas bubbles during cleansing mode, so as to enable a slower flow rate to be employed during that mode;

(ii) a filtering device similar to filter 10 described above, but adapted for use in the filtering of fluids other than raw water, via the provision of other mineral-type or synthetic filtering media; and (iii) a filtering device similar to filter 10 described above, but constructed as an open vessel.

It will further be appreciated by persons skilled in the art, that the present invention is not limited by what has been shown and described hereinabove merely by way of illustrative example. Rather, the scope of the present invention is limited solely by the claims which follow.

What is claimed is:

1. A deep media filter for removing suspended solids from a liquid flow, which includes:
   a filter casing having a liquid inlet port, a liquid outlet port, and a filter bed composed of a volume of granular filter media and located between said inlet port and said outlet port; and
   a screen, selectably movable between a first operative position and a second operative position within said filter casing, whereat in said first operative position said screen maintains said filter bed in a packed state so as to permit filtration therethrough of a liquid flow from said inlet port to said outlet port, and whereat in said second operative position said screen does not maintain said filter bed in a packed state such that in the presence of a liquid flow from said inlet port to said outlet port said volume of filter media expands so as to enable separation therefrom of suspended solids accumulated during filtration of the liquid flow therethrough;
   whereat in said second operative position, said screen is positioned so as to be protected from suspended solids carried in a flow of liquid from said inlet port to said outlet port;
   said filter further including a buffer plate disposed within a downstream end portion of said filter casing transversely to a direction of flow of liquid from said inlet port to said outlet port, and operative to divert a flow of liquid about itself, such that in said second operative position said screen is positioned immediately upstream of said buffer plate, and suspended solids carried in a liquid flow from said inlet port to said outlet port flow around said screen and said buffer plate.

2. A deep media filter according to claim 1, wherein said filter casing is constructed as a closed pressure vessel.

3. A deep media filter according to claim 1, wherein said liquid inlet port is located at a lower end portion of said filter casing and said liquid outlet port is located at an upper end portion of said filter casing, and wherein said filter casing includes an elongate cylindrical casing portion located between said inlet port and said outlet port for substantially housing said filter bed at least in its packed state.

4. A deep media filter according to claim 3, wherein said filter casing also includes a conical casing portion located between a downstream end of said elongate cylindrical casing portion and said outlet port, and wherein said conical casing portion diverges towards said outlet port such that when said screen is in said second operative position, said volume of filter media expands into said conical casing portion in the presence of a liquid flow of a predetermined minimum velocity.

5. A deep media filter according to claim 4, wherein said filter casing further includes an additional cylindrical casing portion located between a downstream end of said conical casing portion and said outlet port.

6. A deep media filter according to claim 3, and including a diffuser unit which has a plurality of diffuser ports located downstream of said inlet port, and said deep media filter further includes a layer of gravel which is located immediately downstream of said diffuser ports and which is composed of grains whose effective diameter is greater than the effective diameter of said diffuser ports.

7. A deep media filter according to claim 6, wherein when said screen is in said first operative position, said layer of gravel supports said filter bed in its packed state, and wherein said gravel layer is operative to prevent ingress of granular filter media into said diffuser ports.

8. A deep media filter according to claim 1, wherein in said first operative position, said volume of granular filter media is composed of granules whose effective diameter decreases in magnitude in the direction of flow from said inlet port to said outlet port.

9. A deep media filter according to claim 8, wherein said volume of granular filter media is composed of granules whose effective diameter decreases in magnitude in the direction from said inlet port to said outlet port following an expansion of said volume of filter media in the presence of a liquid flow in said second operative position.

10. A deep media filter according to claim 1, wherein said volume of granular filter media is formed of a single mineral substance.

11. A deep media filter according to claim 1, wherein said volume of granular filter media is formed of quartz.

12. A deep media filter according to claim 1, and also including retaining apparatus for maintaining said screen in a selected position between one of said first and second operative positions.

13. A deep media filter according to claim 12, wherein said retaining apparatus includes:

a retaining assembly housing said screen; and a movable support rod coupled to said retaining assembly and operative to facilitate selectable translation of said screen between said first and second operative positions.

14. A deep media filter according to claim 13, wherein said retaining assembly includes:

a liquid permeable support plate for supporting said screen; and an annular sealing element disposed about said screen, wherein when said screen is located in said first operative position, said annular sealing element is operative to maintain sealing contact with said filter casing so as to prevent the passage of granular filter media therebetween.

15. A deep media filter according to claim 14, wherein said annular sealing element is at least partially formed of a soft-bristled fibrous material.

16. A deep media filter according to claim 15, wherein said screen and said buffer plate are aligned coaxially, and said buffer plate has lateral dimensions greater than those of said screen.

17. A deep media filter according to claim 15, wherein said screen and said buffer plate are aligned coaxially with respect to a longitudinal axis of said filter casing, and wherein said outlet port is formed adjacent to said longitudinal axis of said filter casing.

* * * * *